United States Patent Office 3,578,437
Patented May 11, 1971

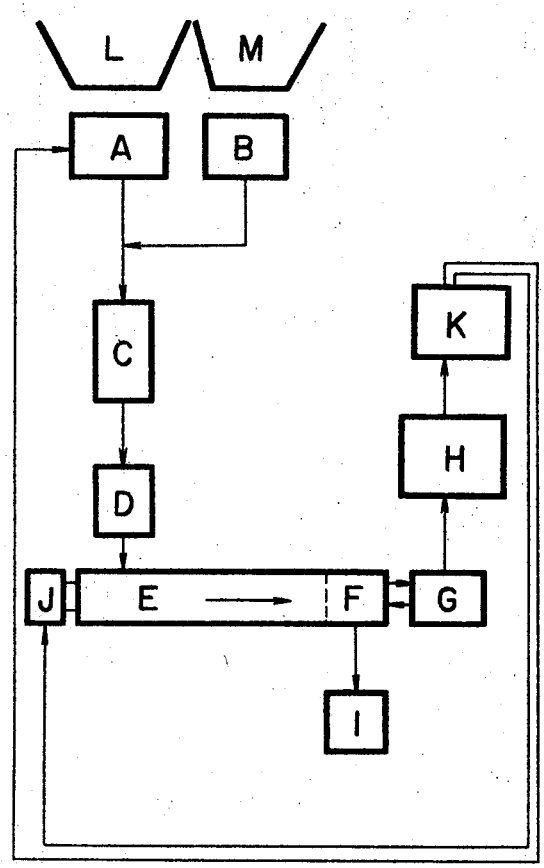

3,578,437
METHOD OF SINTERING ORES
Masaaki Higuchi, Teiji Shibuya, Koichi Onoue, and Seiji Fujii, Fukuyama-shi, Hiroshima-ken, Japan, assignors to Nippon Kokan Kabushiki Kaisha, Tokyo, Japan
Filed Sept. 25, 1968, Ser. No. 762,565
Claims priority, application Japan, Oct. 2, 1967, 42/63,214
Int. Cl. C22b 1/20
U.S. Cl. 75—5
8 Claims

ABSTRACT OF THE DISCLOSURE

In a method of sintering ores, the temperature distribution pattern of the fracture of sintered cakes is measured and the measured value is compared with a predetermined reference temperature distribution pattern to derive a deviation signal which is used to control one or more of the factors that influence the sintering property.

BACKGROUND OF THE INVENTION

This invention relates to a method of sintering iron ore and, more particularly to a method of automatically controlling sintering steps of iron ore in accordance with the temperature distribution of the fracture of sintered cakes.

In the conventional automatic or manual method of controlling sintering steps of iron ore, various parameters have been relied upon. More specifically, the temperature and pressure of exhaust gas from a sintering furnace were measured and the measured values were used to control the speed of a pallet or the ratio of fuel (usually coke) utilized. Inspection by naked eyes of the fracture of sintered cakes was also used as an auxiliary control parameter, although the result could not be used for digital control.

However, such parameters, i.e. values of the temperature and negative pressure of the exhaust gas represent the average values measured in the vertical direction of the sintered layers. In other words, considering respective points in the vertical direction of the sintered layers, such values do not show which point shows the maximum temperature. Thus, for example, even when the temperature gradient of respective wind boxes manifest ideal curves, a large quantity of not sintered powder of iron ore was produced, thus decreasing the yield of sintered ore.

SUMMARY OF THE INVENTION

In accordance with this invention there is provided a novel method of sintering iron ore wherein the sintering state is detected at respective positions in the fracture of sintered cakes and such parameters influencing the sintering property as the speed of the pallet, the ratio of fuel incorporation, the density of the layer of mixed raw materials, the quality of water to be added are controlled automatically in accordance with the deviation of the temperature distribution in said fracture from a reference temperature distribution pattern.

This invention can be more fully understood from the following detailed description taken in connection with the accompanying drawing in which a single figure shows a flow chart of the present invention.

DESCRIPTION OF THE PREFERRED EMBODIMENT

As will be described hereinafter in more detail, as the means for detecting the temperature of the fracture of the sintered cakes, a plurality of radiation pyrometers, a non-scanning type infrared ray camera and an industrial infrared ray television camera have been used. In any case, however, the location of the detector is limited to the exhaust or discharge portion of the sintered cake. This is because that while the sintered ore is conveyed to the exhaust port by the pallet in the form of a continuous layer, as the pallet reverses its direction of movement at the exhaust port the layer is severed into pieces. The entire area of the cross-section or fracture of the sintered cake is exposed at this time, and the exposed fracture can be inspected without any obstruction. Further in any detecting system it is necessary to provide a suitable computer to provide commands that control various factors influencing the sintering property. Mere manual control in accordance with the temperature distribution of the sintered cake can not attain the object of this invention.

In any of the control systems it is advantageous to predetermine an ideal temperature distribution pattern and to set the computer such that it will provide an automatic sintering operation in accordance with the deviation from this ideal pattern, thus obtaining an ideal temperature distribution at all times.

Finally, although control may be effected for each pallet by detecting the temperature only when the axis of the detector becomes perpendicular to the fracture of the sintered cake, in actual operation it is advantageous to continuously detect the temperature and to perform automatic control in accordance with the temperature distribution averaged for 5 to 10 pallets. In this case, while the temperature detector also detects the temperature of the upper surface of the sintered cake which is different from the fracture, as the temperature of the upper surface is very low its measured value can be eliminated as a noise signal in the computer.

The following examples are given by way of illustration of this invention and not as a limitation thereof.

EXAMPLE 1

25 equally spaced radiation pyrometers were installed at the exhaust port so that they can detect the temperature of the entire surface of sintered cakes and the respective pyrometers were identified by appropriate symbols corresponding to their locations so as to send measured values to a computer.

The following patterns were selected as control references.

| Temperature distribution | Symbols | Patterns | | | | |
|---|---|---|---|---|---|---|
| Less than 300° C | — | — | — | — | — | — |
| 300–500° C | + | + | + | + | + | + |
| 500–700° C | X | Δ | O | O | O | Δ |
| 700–900° C | Δ | O | ⊙ | ⊙ | ⊙ | O |
| 900–1,100° C | O | Δ | O | O | O | Δ |
| Above 1,100° C | ⊙ | | | | | |

Detection of the temperature was made continuously and only those corresponding to the fracture of the sintered cake were selected by the computer. The deviation of the average value for five pallets from the reference pattern was obtained to control the speed of movement of the pallets.

EXAMPLE 2

Using an opaque plate corresponding to an enlargement of a light receiving plate of a commercial Samar camera (a non-scanning type infrared ray camera), slits of the desired number (25 in this embodiment) were cut through the opaque plate and a photocell was placed at each slit to convert the variation in the intensity of the infrared ray to a corresponding variation in the intensity of visible light, thus converting the differences in the temperature distribution into suitable digital values which were then supplied to the computer.

The image pick-up position of the camera was the same as that in Example 1 and the variation in the ratio of mixing fuel was selected as the control parameter.

EXAMPLE 3

An image pick-up element of an industrial infrared ray television was installed at the exhaust port of the sintered cakes as in Example 1. In a control chamber the intensity of the infrared ray was displayed by a cathode ray tube of a receiver while at the same time currents flowing through horizontal and vertical deflection coils were stored as values representing the brightness of photocells. Thus for example, when the current flowing through the vertical deflection coil at a given instant and the current flowing through the horizontal deflection coil at the same instant are determined, the position on the fluorescent screen can be specified whereby the temperature distribution over the entire fracture of a sintered cake when the brightness (intensity of the infrared rays) at the same instance is taken into consideration may be determined. Different from Examples 1 and 2, according to this example utilizing the infrared ray scanning system it is not necessary to use any particular temperature detector. In addition, the number of measuring positions for determining the temperature distribution of the fracture of the sintered cake can be readily increased almost unlimitedly by the computer.

In this example, temperatures at about 150 measuring points were detected to obtain the deviation from the reference pattern previously stored in the computer to control the speed of the pallet, thus controlling the rate of production per hour. In addition, the ratio of incorporation of fuel was also controlled to improve the quality of the sintered cake as well as its productivity. In this example, image pick-up by the television camera at the exhaust port was carried out continuously but signals representing the low temperature surface portion of the cake was eliminated as a noise signal, and the control was effected in accordance with the mean value of the temperature distribution of the fracture of the sintered cakes for light pallets.

In this example, in order to provide a direct digital representation of the temperature distribution in addition to the automatic control a plotter was used to plot the temperatures on a recording paper as symbols (same as those used in Example 1). By collecting symbols of the same type it was possible to simply determine the temperature distribution and its area ratio.

Referring to the accompanying drawing which shows one example of a flow chart illustrating the novel sintering method, iron ore supplied by an ore bin M and coke or fuel supplied by a coke bin L are fed to a mixer and pelletizer C, respectively, by conveyors B and A. The mixed raw material is then supplied to a sintering machine E through a hopper D. At the discharge end F of the sintering machine is provided a temperature detector or an image pick-up element of an infrared ray television G. The sintering machine E is provided with a hopper I for receiving sintered ore, and a pallet driving motor J which is controlled by the output from the temperature detector or television image pick-up element G through a computer H and a control device K.

This invention has the following merits.

(1) The quantity of unburned ore was reduced, thus improving productivity.

(2) As the control can be effected automatically, the number of workmen was reduced.

(3) As the type of the ore and the sintering property for different grain size can be represented digitally, results caused by the change in the ratio of mixing of raw materials can be readily anticipated.

Thus, this invention provides a novel method of sintering ores in which the temperature distribution of the fracture of sintered cakes is determined digitally, and the result is compared with a reference pattern to derive the difference therebetwen, which difference is utilized to control factors that influence the sintering property.

While radiation pyrometers, non-scanning type Samar cameras and infrared ray television cameras have been illustrated as temperature detecting means it should be understood that this invention is not limited to these particular means. Further it is to be understood that in addition to the above discussed factors, that is, speed of pallets and the ratio of incorporation of fuel, there are many other factors such as the quantity of water added, the density of the layer of raw material, the degree of opening of the damper of the wind box, the grain size of the raw material, type of the ore and the like which may be used for controlling the sintering step singly or in combination. The ideal temperature distribution of the sintered cake at the exhaust portion differs largely in accordance with the grain size of the ore, type thereof, requirement of the blast furnace and dimensions of the sintering machine so that the pattern of this example is not always suitable for any case. Thus, the pattern should be revised from time to time through constant research for improving the sintering properties and productivity.

What is claimed is:

1. In a method of sintering ores:
   directly measuring the temperature distribution pattern of an exposed cross-sectional surface of a sintered cake in the sintering machine;
   generating a deviation signal representing the deviation of the measured temperature distribution pattern from a predetermined reference temperature distribution pattern; and
   controlling a factor that influences the sintering property responsive to said deviation signal.

2. The method according to claim 1 wherein said sintered cake is carried by a pallet, said temperature distribution pattern measurement being made when the sintered cake carried by the pallet changes its direction.

3. The method according to claim 1 wherein said temperature distribution pattern measurement is made at the discharge end of a continuous sintering machine.

4. The method according to claim 3 wherein measuring said temperature distribution pattern comprises receiving radiations from said surfaces by a radiation pyrometer.

5. The method according to claim 3 wherein measuring said temperature distribution pattern comprises receiving infrared ray radiations from said surface by a non-scanning type infrared ray camera.

6. The method according to claim 3 wherein measuring said temperature distribution pattern measurement comprises receiving signals from said surface of a television camera.

7. The method according to claim 1 wherein said deviation signal is generated by supplying the result of the temperature distribution pattern measurement to a computer; comparing said result with a reference temperature distribution pattern, which is stored in said computer; and generating said deviation signal which is utilized to control said sintering factor.

8. The method according to claim 1 wherein at least one of the speeds of the pallet, the ratio of incorporation of the fuel, the quantity of water added, the density of the fuel layer, the degree of opening of the damper of the wind box, the grain size of the raw material, and the type of the ore is controlled responsive to said deviation signal.

References Cited

UNITED STATES PATENTS

| 2,878,003 | 3/1959 | Dykeman et al. | 75—5UX |
| 3,399,053 | 8/1968 | Schutz et al. | 75—5 |

FOREIGN PATENTS

| 962,394 | 7/1964 | Great Britain | 75—5 |

ALLEN B. CURTIS, Primary Examiner